United States Patent [19]

Yamashiro

[11] Patent Number: 4,536,117
[45] Date of Patent: Aug. 20, 1985

[54] SCREW FASTENER

[75] Inventor: Ernest Yamashiro, Skokie, Ill.

[73] Assignee: Mid-Continent Screw Products Company, Lincolnwood, Ill.

[21] Appl. No.: 621,146

[22] Filed: Jun. 18, 1984

Related U.S. Application Data

[63] Continuation of Ser. No. 325,637, Nov. 30, 1981, abandoned.

[51] Int. Cl.³ .............................................. F16B 25/00
[52] U.S. Cl. ................................................... 411/411
[58] Field of Search ............... 411/414, 411, 423, 412, 411/378, 436, 308, 309, 310, 311, 263

[56] References Cited

U.S. PATENT DOCUMENTS

| 410,698 | 9/1889 | Rogers . | |
| 1,229,560 | 6/1917 | Whiteman | 411/411 |
| 1,451,484 | 4/1923 | Woodward | 411/311 |
| 3,069,960 | 12/1962 | Baubles | 411/411 |
| 3,104,161 | 9/1963 | Carlson | 411/411 X |
| 3,207,023 | 9/1965 | Knohl . | |
| 3,249,142 | 5/1966 | Phipard | 411/311 |
| 3,426,820 | 2/1969 | Phipard | 411/310 |
| 3,748,949 | 7/1973 | Dreger | 411/411 |
| 3,794,092 | 2/1974 | Carlson | 411/310 |

FOREIGN PATENT DOCUMENTS

| 1085723 | 7/1960 | Fed. Rep. of Germany | 411/411 |
| 2754870 | 6/1979 | Fed. Rep. of Germany | 411/411 |
| 876474 | 11/1942 | France | 411/411 |
| 536977 | 12/1955 | Italy | 411/411 |

OTHER PUBLICATIONS

Frank Yeaple, "World of Self-Locking Screws Grows", *Product Engineering*, Apr. 1979, p. 57, FIG. 9.
A brochure from N. L. Southern Screw, N. L. Industries, Inc.

*Primary Examiner*—Gary L. Smith
*Assistant Examiner*—Adrian H. Whitcomb, Jr.
*Attorney, Agent, or Firm*—Fitch, Even, Tabin & Flannery

[57] ABSTRACT

A self-tapping screw fastener for driving into a workpiece. The self-tapping screw fastener includes a generally cylindrical shank having an entering end and a trailing end, driving means integrally joined with the trailing end and an external helical thread, integral with the shank and adapted for forming a complimentary thread in the workpiece. The helical thread has a double angle profile which is defined by a base portion having a relatively large included angle and a crest portion having a relatively small included angle.

3 Claims, 4 Drawing Figures

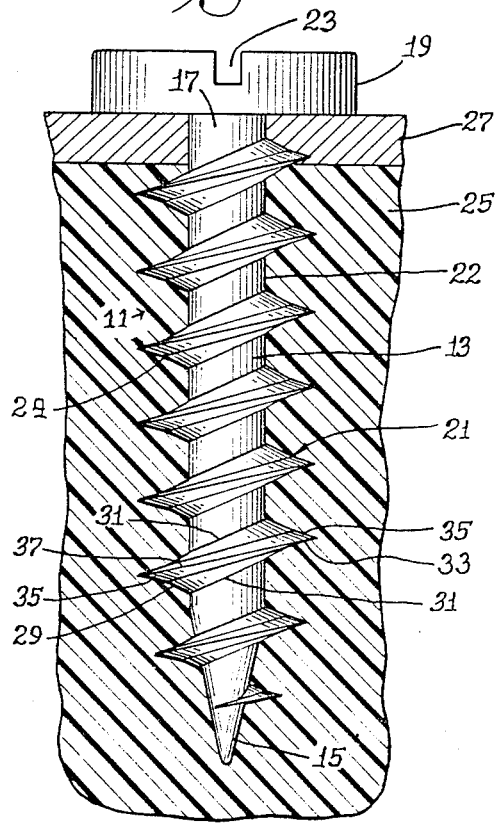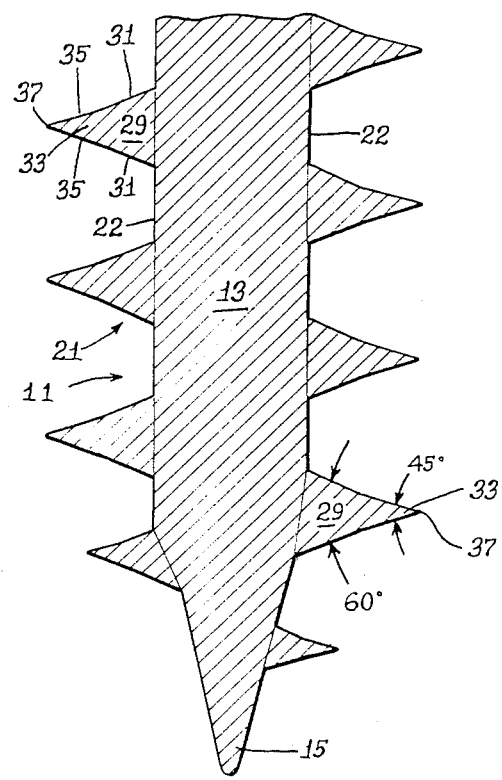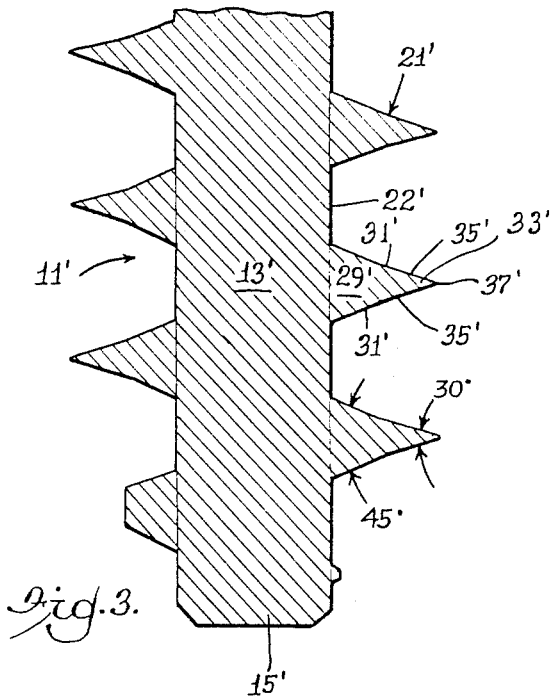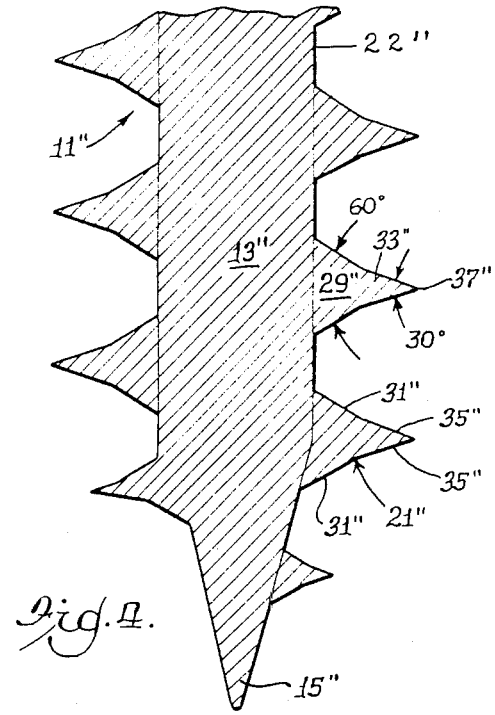

SCREW FASTENER

This application is a continuation of Ser. No. 325,637 filed on Nov. 30, 1981. now abandoned.

BACKGROUND OF THE INVENTION

1. Field of the Invention

The present invention relates generally to screw fasteners and more particularly to self-tapping screw fasteners having a novel thread design.

2. Description of the Prior Art

Many types of self-tapping screw fasteners such as wood screws and sheet metal screws have been available for a number of years. The screw fasteners are generally made from metal and include a cylindrical shank with an integrally joined external helical thread that forms a plurality of substantially uniformly spaced convolutions along the shank. The shank generally has a trailing end with a driving means, such as a tool engageable head and an entering end which may be blunt or pointed. Conventionally, the helical thread has a triangular thread profile which is determined by a transverse cross section of the screw thread. The thread thus presents a sharp edge on its crest so that axial loading of the screw fastener coupled with rotational motion drives the fastener into a workpiece and forms a complementary internal thread therein.

The method of use and the design of self-tapping screw fasteners are often adapted to accommodate the physical properties of the intended workpiece.

When the workpiece is a high strength but generally ductile material, such as most types of sheet metal, a pilot hole is generally provided in order that the torque necessary to drive the fastener be reduced. Pilot holes are also often provided when self-tapping screw fasteners are used in brittle materials, such as phenolic plastics, because tensile stresses generated by the fastener entering the workpiece frequently cause it to crack or become stripped of the complementary thread formed therein. When used in conjunction with a pilot hole, a blunt entering end on the screw fastener is generally sufficient to initiate proper entry into the workpiece.

When the workpiece is a relatively low strength material, such as many types of wood and various plastics, the fasteners are often driven without the benefit of a pilot hole. Screw fasteners for this purpose are usually provided with a conical or tapered entering end that often has a cutting edge to facilitate entry into the workpiece. The problems of cracking the workpiece and stripping the complementary thread are aggravated when the screw fasteners are used without benefit of a pilot hole.

In all cases, regardless of the workpiece material or the use of a pilot hole, it is desirable that the self-tapping screw fastener require only relatively low driving torque, and have high stripping torque and pullout strength and substantial resistance to loosening. It is also desirable to provide a fastener that will minimize the tendency to crack a brittle workpiece.

Various types of self-tapping screw fasteners have been developed in an effort to achieve at least some of the aforementioned desired characteristics. One such screw fastener is described in U.S. Pat. No. 3,207,023 and includes a first helical thread which has a generally triangular thread profile with a relatively large thread height and a relatively small included angle. The large thread height causes the thread to project into the workpiece relatively deeply so as to provide a large area of engagement between the thread and the workpiece. The small included angle of the thread profile facilitates entry of the high thread into the workpiece. A second helical thread is located between the convolutions of the first helical thread and also has a triangular thread profile but a relatively small thread height and large included angle. The second helical thread adds to the area of thread contact with the workpiece in an attempt to increase the resistance to loosening and the pullout strength of the screw fastener.

The screw fastener disclosed in U.S. Pat. No. 3,207,023 has the disadvantage that it requires two helical threads. This makes the fastener substantially more expensive and difficult to manufacture than conventional screw fasteners. It also requires that the screw fastener have a greater number of thread convolutions per inch, or a shorter pitch, in order to obtain the advantages of the invention. This, of course, increases the torque required to drive the screw fastener. Standard screw fasteners of this type generally have about 18 thread convolutions per inch.

BRIEF DESCRIPTION OF THE INVENTION

In accordance with the present invention, a self-tapping screw fastener is provided having a generally cylindrical shank and an external, integrally joined, helical thread that forms a plurality of substantially uniformly axially spaced convolutions along the shank. The shank has an entering end which may be pointed or blunt and a trailing end with driving means, such as a tool engageable head, integrally connected thereto.

The helical thread has a double angle thread profile which is determined by a transverse cross section of the thread and defined by a base portion and a crest portion. The base portion is adjacent the cylindrical shank and has a first pair of spaced-apart and converging flank surfaces which define a first, relatively large, predetermined included angle. The crest portion is formed integral with the base portion and has a second pair of flank surfaces that converge to a sharp outer edge so as to define a second, relatively small, predetermined included angle. By forming the crest portion of the thread with a relatively small included angle and a sharp edge, a substantially reduced driving torque is required to cause the crest to cut deeply into the workpiece while the possibility of cracking or stripping the workpiece is minimized. The relatively large included angle of the base portion provides the thread with strength and rigidity and increases the resistance of the screw fastener to loosening. The double angle thread profile permits the use of a greater thread height thereby increasing the radial engagement of the thread with the workpiece as compared to conventional threads so that the pullout strength of the screw fastener is significantly increased. The double angle thread profile has the further advantage that it enables use of a single helical thread in order to obtain the advantages of the invention. This simplifies fabrication of the screw fastener and allows the use of a relatively low number of thread convolutions per inch so that a greater volume of material is engaged between adjacent convolutions to further increase pullout strength and stripping torque.

Accordingly, a general object of the present invention is to provide a new and improved self-tapping screw fastener that minimizes the possibility of damage to the workpiece and has high pullout strength and stripping torque, improved resistance to loosening, and which requires low driving torque.

Another object of the invention is to provide a self-tapping screw fastener employing a helical thread having a novel thread profile which results in higher pull-out strength and stripping torque, provides improved resistance to loosening, and requires a relatively low driving torque.

A more particular object of the present invention is to provide a new and improved self-tapping screw fastener having a novel double angle thread profile defined by a base portion having a first pair of spaced-apart, converging flank surfaces defining a first, relatively large, predetermined included angle and a crest portion integrally formed with the base portion and having a second pair of flank surfaces which converge to a sharp edge and define a second, relatively small, predetermined included angle, the screw fastener being particularly adapted for use with high strength, low strength, brittle or ductile material. Further objects and advantages of the invention will become apparent from the following detailed description when taken with the accompanying drawings of which:

FIG. 1 is a fragmentary sectional view illustrating a first embodiment of a self-tapping screw fastener in accordance with the present invention affixing a plate to a workpiece;

FIG. 2 is an enlarged fragmentary sectional view of the bottom portion of the screw fastener of FIG. 1 schematically showing a transverse cross section of the helical thread of the invention defining its double angle thread profile;

FIG. 3 is an enlarged fragmentary sectional view similar to FIG. 2, but illustrating a second embodiment of a screw fastener in accordance with the present invention; and FIG. 4 is an enlarged fragmentary sectional view similar to FIGS. 2 and 3, but illustrating a third embodiment of a screw fastener in accordance with the invention.

DETAILED DESCRIPTION OF THE INVENTION

Referring now to the drawings and in particular to FIG. 1, a first embodiment of a self-tapping screw fastener constructed in accordance with the present invention is indicated generally by reference numeral 11. The screw fastener 11 is illustrated in FIG. 1 as securing a first member, such as a plate 27, to a second member such as a workpiece 25, the fastener having threaded engagement with the workpiece.

The screw fastener 11 includes a cylindrical shank 13 having an entering end 15, a trailing end 17, driving means in the form of a head section 19 integrally connected to the trailing end 17 of the shank 13, and a helical thread 21 integral with the shank 13 and forming a plurality of substantially uniformly spaced convolutions thereon. A helical root 22 is defined on the shank 13 between adjacent convolutions of the helical thread 21.

The head section 19 includes tool engageable means such as a slot 23 adapted for receiving a screwdriver so as to enable imparting of a rotational torque to the screw fastener 11 for driving it into the workpiece 25 and forming a complementary internal thread 24 therein. In the embodiment illustrated in FIGS. 1 and 2, the entering end 15 of the screw fastener is generally conical in shape and is of the type conventionally employed when the fastener is driven into the workpiece 25 without a pilot hole. While FIG. 1 shows the screw fastener 11 used to secure a plate-like member 27 to a plastic workpiece 25, it will be apparent that the screw fastener 11 may be used for a variety of purposes.

The helical thread 21 has a double angle thread profile, which is determined by a transverse cross section of the thread as illustrated in FIG. 2. The double angle thread profile is defined by a base portion 29 having a first, relatively large, predetermined included angle defined by a first pair of spaced-apart, converging flank surfaces 31 and a crest portion 33 having a second, relatively small, predetermined included angle defined by a second pair of flank surfaces 35 that converge to a sharp edge 37. The base portion 29 has a generally trapezoidal cross section with the longest of the two parallel sides adjacent the shank 13 as shown in FIG. 2. The crest portion 33 is formed integral with the base portion 29 and is generally triangular in cross section with the base of the triangular crest being common with the shortest of the two parallel sides of the trapezoidal cross section of the base portion.

In a preferred embodiment of the invention, the base portion 29 and crest portion 33 each comprise about one-half of the total thread height as measured from the root 22 to the sharp edge 37 of the crest portion 33 along a line perpendicular to the axis of the shank 13. The total thread height is substantially uniform along the axis of the shank 13 but tapers to zero near the entering end 15 of the screw fastener. Thus, the cutting action of the crest portion 33 in forming the complementary thread 24 in the workpiece 25 is gradual, with a low angle crest cut leading the entry of the relatively high angle base portion 29. The low angle crest cut preceding full entry of the base portion 29 greatly reduces the generation of stresses in the workpiece 25 during the formation of the complementary thread 24 thus minimizing the possibility of fracturing the workpiece and reducing the driving torque required to rotate the fastener 11. The height of the base portion 29 can be increased in relation to the height of the crest portion 33 as desired to further increase the pullout strength and resistance of the fastener 11 to loosening. It will be appreciated, however, that increasing the height of the base portion relative to the total thread height increases the driving torque required to rotate the fastener 11, as well as the stresses imparted to the associated workpiece.

The stripping torque and pullout strength of a screw fastener driven into a given workpiece are both directly proportional to the thread height of the fastener. As mentioned, the use of a screw fastener provided with a double angle thread profile minimizes the stresses imparted to the workpiece. Thus, a screw fastener constructed in accordance with the present invention may be provided with a greater total thread height than a conventional screw fastener before its use will initiate cracking of the workpiece. A greater thread height increases the radial thread engagement with the workpiece and, accordingly, the stripping torque and pullout strength of the fastener.

Stripping torque and pullout strength are also proportional to the pitch of the screw fastener which is defined as the axial spacing between adjacent thread convolutions. A large pitch increases stripping torque and pullout strength by permitting the engagement of a greater volume of the workpiece material between adjacent thread convolutions. In one embodiment of the invention, screw fasteners having a single helical thread are provided with a pitch of about 0.10 inch. By way of comparison, other known types of screw fasteners, for example, the type having two helical threads, generally have a pitch of about 0.056 inch.

In the embodiment illustrated in FIGS. 1 and 2 the thread profile defines a base portion 29 having a relatively large included angle of 60° and a crest portion 33 having a relatively small included angle of 45°. This combination of included angles in the thread 21 has proved to be ideal for use in materials such as many types of wood and soft plastics. However, when self-tapping screw fasteners are used in brittle materials, such as hard phenolic plastics, it is often necessary to further reduce the stresses associated with driving the fastener in order to prevent cracking of the workpiece. For this purpose a second embodiment of the invention is provided and illustrated in FIG. 3 wherein like parts have been designated with like single prime numbers. To facilitate entry of the fastener 11', a brittle workpiece is generally provided with a pilot hole so the fastener 11' has a blunt entering end 15'. In the second embodiment of the screw fastener 11' the included angles of the base portion 29' and the crest portion 33' of the thread 21' have been reduced from the embodiment shown in FIGS. 1 and 2 to 45° and 30°, respectively. Thus, the thread 21' displaces less material when forming a complementary thread and thereby lowers the stresses generated in an associated workpiece so as to minimize the possibility of cracking.

A third embodiment of the invention is illustrated in FIG. 4 wherein like parts have been designated with like double prime numbers. In the third embodiment of the screw fastener, indicated generally by reference numeral 11", the thread 21" includes a base portion 29" having an included angle of 60° and a crest portion 33" having an included angle of 30°. In this embodiment of the screw fastener 11", considerably less driving torque is required than with conventional fasteners because of the low included angle of the crest portion 33". However, because there is a large differential between the included angles of the base 29" and crest 33" portions, the fastener 11", does not minimize the cracking of the workpiece as well as the embodiments shown in FIGS. 1–3.

The self-tapping screw fastener of the invention is readily fabricated by methods similar to those used for conventional screw fasteners. Screw fasteners are most often manufactured from metal wire stock, the composition of which is chosen for cold formability and anticipated service conditions. The wire stock is sheared to the proper blank length and cold headed to form a driving means such as the tool engageable head 19 shown in FIG. 1. The thread, shank and entering end are generally cold formed by rolling in either reciprocating, cylindrical or rotary-planetary die machines.

In the screw fastener of the invention, the helical thread is formed in what is essentially a two-stage process in order to provide it with a double angle thread profile. An enlarged base portion is first roll formed on the headed blank, in a first set of die cavities. The peripheral portion of the enlarged base portion is then further deformed in a second set of die cavities to form the crest portion 33 of the double angle helical thread 21. Both sets of die cavities are easily provided in a single die so that need to handle the fastener between stages of thread formation is unnecessary. With this process of thread rolling, the helical thread having the double angle thread profile can easily be formed with tolerances of ±2° on the included angles.

It will be understood that while preferred embodiments of the present invention have been illustrated and described, various modifications may be made therein without departing from the invention in its broader aspects.

Various features of the invention are set forth in the following claims.

What is claimed is:

1. A self-tapping screw fastener for driving into a workpiece comprising:
   generally cylindrical shank having an entering end and a trailing end;
   a tool-engagable head integrally joined with the trailing end of the shank; and
   an external helical thread, integral with the shank, forming a plurality of convolutions substantially uniformly spaced along the axis of the shank so as to leave a helical portion of the shank exposed, the thread being adapted for forming a complementary thread in the workpiece;
   the helical thread having a double angle thread profile determined by a transverse cross section of the thread and defined by a base portion and a crest portion;
   the base portion of the helical thread being adjacent the shank and having a trapezoidal cross-section defined by a first pair of converging, spaced-apart flank surfaces that define a first included angle of about 60°;
   the crest portion of the helical thread being adjacent the base portion, and having an isosceles triangular cross-section defined by a second pair of flank surfaces that converge to a sharp cutting edge to facilitate forming the complementary thread in the workpiece by making a cut therein and define a second predetermined included angle of about 45°;
   the first predetermined included angle being greater than the second predetermined included angle; and
   the height of the helical thread being substantially uniform along the generally cylindrical shank but tapering to zero along the entering end so that when the screw is driven into the workpiece the low angle crest leads the entry of the base portion into the workpiece.

2. A self-tapping screw fastener for driving into a workpiece comprising:
   a generally cylindrical shank having an entering end and a trailing end;
   a tool-engageable head integrally joined with the trailing end of the shank; and
   an external helical thread, integral with the shank, forming a plurality of convolutions substantially uniformly spaced along the axle of the shank so as to leave a helical portion of the shank exposed, the thread being adapted for forming a complementary thread in the workpiece;
   the helical thread having a double angle thread profile determined by a transverse cross section of the thread and defined by a base portion and a crest portion;
   the base portion of the helical thread being adjacent the shank and having a trapezoidal cross-section defined by a first pair of converging, spaced-apart flank surfaces that define a first included angle of about 45°;

the crest portion of the helical thread being adjacent the base portion, and having an isosceles triangular cross-section defined by a second pair of flank surfaces that converge to a sharp cutting edge to facilitate forming the complementary thread in the workpiece by making a cut therein and define a second predetermined included angle of about 30°;

the first predetermined included angle being greater than the second predetermined included angle; and the height of the helical thread being substantially uniform along the generally cylindrical shank but tapering to zero along the entering end so that when the screw is driven into the workpiece the low angle crest leads the entry of the base portion into the workpiece.

3. A self-tapping screw fastener for driving into a workpiece comprising:

a generally cylindrical shank having an entering end and a trailing end;

a tool-engageable head integrally joined with the trailing end of the shank; and an external helical thread, integral with the shank, forming a plurality of convolutions substantially uniformly spaced along the axis of the shank so to leave a helical portion of the shank exposed, the thread being adapted for forming a complementary thread in the workpiece;

the helical thread having a double angle thread profile determined by a transverse cross section of the thread and defined by a base portion and a crest portion;

the base portion of the helical thread being adjacent the shank and having a trapezoidal cross-section defined by a first pair of converging, spaced-apart flank surfaces that define a first included angle of about 60°;

the crest portion of the helical thread being adjacent the base portion, and having an isosceles triangular cross-section defined by a second pair of flank surfaces that converge to a sharp cutting edge to facilitate forming the complementary thread in the workpiece by making a cut therein and define a second predetermined included angle of about 30°;

the first predetermined included angle being greater than the second predetermined included angle; and the height of the helical thread being substantially uniform along the generally cylindrical shank but tapering to zero along the entering end so taht when the screw is driven into the workpiece the low angle crest leads the entry of the base portion into the workpiece.

* * * * *